(12) United States Patent
Lin

(10) Patent No.: US 9,196,143 B2
(45) Date of Patent: Nov. 24, 2015

(54) MOBILE DEVICE, METHOD AND NON-TRANSITORY COMPUTER-READABLE STORAGE MEDIUM FOR MONITORING A VEHICLE PATH

(71) Applicant: Institute for Information Industry, Taipei (TW)

(72) Inventor: Jyun-Naih Lin, Taipei (TW)

(73) Assignee: INSTITUTE FOR INFORMATION INDUSTRY, Taipei (TW)

(\*) Notice: Subject to any disclaimer, the term of this patent is extended or adjusted under 35 U.S.C. 154(b) by 127 days.

(21) Appl. No.: 14/048,179

(22) Filed: Oct. 8, 2013

(65) Prior Publication Data

US 2015/0057924 A1 Feb. 26, 2015

(30) Foreign Application Priority Data

Aug. 23, 2013 (TW) .............................. 102130302 A

(51) Int. Cl.
*G01C 21/36* (2006.01)
*G08G 1/133* (2006.01)
(Continued)

(52) U.S. Cl.
CPC ............ *G08B 21/02* (2013.01); *G01C 21/3655* (2013.01); *G01C 21/3661* (2013.01);
(Continued)

(58) Field of Classification Search
CPC .......... G01C 21/3626; G01C 21/3655; G01C 21/3661; G01C 21/3688; G01C 21/3697; G08G 1/127; G08G 1/13; G08G 1/133; G08G 1/137; G08G 1/207; G01S 19/14; G08B 21/02

USPC .......................................................... 701/484
See application file for complete search history.

(56) References Cited

U.S. PATENT DOCUMENTS 5,532,690 A * 7/1996 Hertel ............................ 340/989
6,363,323 B1 * 3/2002 Jones ............................ 701/468
(Continued)

FOREIGN PATENT DOCUMENTS

JP     2009121876 A  *  6/2009
KR    10-1144542 B   *  5/2012
(Continued)

OTHER PUBLICATIONS

Sun, Lin et al., "Real time anomalous trajectory detection and analysis", Mobile Networks and Applications, Jun. 2013, vol. 18, Issue 3, pp. 341-356 (published online Nov. 8, 2012).*
(Continued)

*Primary Examiner* — Behrang Badii
*Assistant Examiner* — David Testardi
(74) *Attorney, Agent, or Firm* — McClure, Qualey & Rodack, LLP

(57) ABSTRACT

The invention discloses a mobile device for monitoring a vehicle path. The mobile device includes a setting module, a satellite-positioning module, a determination module, and an alarm module. The setting module is configured to set a preset route from a starting point to a destination. The satellite-positioning module is configured to receive a satellite-positioning signal. When the mobile device is located in a vehicle, the determination module is configured to determine whether the vehicle is driving along the preset route based on the satellite-positioning signal. When the vehicle deviates from the preset route for a default alarming time, the alarm module is configured to perform an alarm action.

17 Claims, 4 Drawing Sheets

(51) Int. Cl.
  *G08B 21/02* (2006.01)
  *G08B 25/00* (2006.01)
  *G07C 5/00* (2006.01)
  *G01S 19/14* (2010.01)
  *G08G 1/00* (2006.01)
  *G07C 5/08* (2006.01)

(52) U.S. Cl.
  CPC ............ *G01C21/3688* (2013.01); *G01S 19/14* (2013.01); *G07C 5/008* (2013.01); *G08B 25/00* (2013.01); *G08G 1/133* (2013.01); *G07C 5/085* (2013.01); *G08G 1/207* (2013.01)

(56) References Cited

U.S. PATENT DOCUMENTS

| | | | |
|---|---|---|---|
| 7,149,533 B2* | 12/2006 | Laird et al. | 455/456.3 |
| 7,812,711 B2 | 10/2010 | Brown et al. | |
| 7,835,859 B2 | 11/2010 | Bill | |
| 7,899,592 B2 | 3/2011 | Yaqub | |
| 7,941,267 B2 | 5/2011 | Adamczyk et al. | |
| 8,255,162 B2 | 8/2012 | Okude et al. | |
| 8,350,696 B2 | 1/2013 | McClellan et al. | |
| 8,639,439 B2 | 1/2014 | Lee et al. | |
| 8,688,306 B1* | 4/2014 | Nemec et al. | 701/25 |
| 2008/0162034 A1* | 7/2008 | Breen | 701/202 |
| 2009/0201201 A1* | 8/2009 | Foster | 342/357.07 |
| 2011/0071758 A1* | 3/2011 | Cho et al. | 701/211 |
| 2012/0150427 A1* | 6/2012 | Jeong et al. | 701/409 |
| 2012/0164968 A1* | 6/2012 | Velusamy et al. | 455/404.2 |
| 2012/0203599 A1 | 8/2012 | Choi et al. | |
| 2012/0233246 A1 | 9/2012 | Guemez | |
| 2013/0013381 A1 | 1/2013 | Liu | |
| 2015/0081362 A1* | 3/2015 | Chadwick et al. | 705/7.14 |

FOREIGN PATENT DOCUMENTS

| | | |
|---|---|---|
| TW | 201133263 A | 10/2011 |
| TW | 201239823 A | 10/2012 |
| WO | 0231528 A2 | 4/2002 |
| WO | 03069576 A1 | 8/2003 |
| WO | 2013001553 A1 | 1/2013 |

OTHER PUBLICATIONS

Examination report for corresponding application in Taiwan (Mar. 24, 2015).

* cited by examiner

MOBILE DEVICE, METHOD AND NON-TRANSITORY COMPUTER-READABLE STORAGE MEDIUM FOR MONITORING A VEHICLE PATH

RELATED APPLICATIONS

This application claims priority to Taiwan Application Serial Number 102130302, filed Aug. 23, 2013, which is herein incorporated by reference.

BACKGROUND

1. Field of Invention

The present invention relates to a front-end monitoring technology. More particularly, the present invention relates to a mobile device, a method, and a non-transitory computer-readable storage medium for monitoring a vehicle path.

2. Description of Related Art

Usually, when passengers intend to reach a place without taking public transportation that has a fixed travel route, they tend to select a vehicle assigned by a vehicle dispatch company so as to ensure their rights and safety during transportation. The dispatch vehicle reaches a predetermined location at a predetermined time, and delivers the passenger to the destination that the vehicle dispatch company has been required to preset in advance. Or, the passengers tend to make a car reservation through the dispatch service provider of business passenger cars.

Since the vehicle dispatch company has been informed of the destination when the passenger makes the reservation, the back-end vehicle dispatch company is able to monitor the path of the dispatch vehicle. However, if the passenger is not familiar with the destination or even cannot judge whether the vehicle is moving along the correct path, the passenger is unable to control his own rights and safety. When the back-end vehicle dispatch company finds the abnormal path of the dispatch vehicle (such as a detour made by the driver, the driver intentionally delivering the passenger to another location, etc.) that possibly causes the passenger being jeopardized or suffering damages, it is not able to ensure the passenger's rights and safety in a timely manner.

Many dispatch service providers of business passenger cars have provided the conditions of the drivers, for example: community website evaluation system, police criminal information system, etc., to allow the passengers to select drivers in advance when making their reservations so as to ensure that the driver of the reserved car does not have any bad record in the community website evaluation system or the police criminal information system. However, these conditions for selecting the driver are only for reference, which cannot secure the passenger's rights and safety when taking the car reserved. Because the dispatch service providers of business passenger cars only monitor the path of the reserved car and do not know the passenger's destination, they cannot ensure the passenger's rights and safety in a timely manner when the back-end vehicle dispatch company finds that the abnormal path of the dispatch car would possibly cause the passenger being jeopardized or suffering damages.

Nowadays, there are systems available to allow passengers to see street views of some attractions along the route and the destination in advance from the mobile device through servers. Under the circumstances, the passenger determines whether the vehicle is moving along the normal path by himself. However, if the server does not contain the street views selected by the passenger, or if the passenger, being a foreigner or a visually impaired person, cannot distinguish the street views that the vehicle has passed, the passenger is not able to see street views of the attractions along the route and the destination in advance from the mobile device.

In summary, the prior art device for monitoring the vehicle path cannot monitor the vehicle path without the support of the back end. Or, the passenger must compare the known street views with the actual street views outside the vehicle windows. No matter how, the passenger's rights and safety cannot be ensured at the very first time when the driving path is abnormal. Therefore, it is one of the important subjects and the objective needs to be improved in the related areas to allow the passenger to be the monitor. By utilizing the mobile device carried by the passenger, the passenger is informed when the vehicle drives along an abnormal path so that the passenger becomes vigilant.

SUMMARY

A mobile device, a method, and a non-transitory computer-readable storage medium for monitoring a vehicle path active are provided to resolve the problems of the prior art.

The mobile device comprises a setting module, a satellite-positioning module, a determination module, and an alarm module. The setting module is configured to set a preset route from a starting point to a destination. The preset route comprises at least one preset point. The satellite-positioning module is configured to receive a satellite-positioning signal. The determination module is configured to determine whether a vehicle is driving along the preset route based on the satellite-positioning signal when the mobile device is located in the vehicle. When the vehicle deviates from the preset route for a default alarming time, the alarm module is configured to perform an alarm action.

The invention provides a method for monitoring a vehicle path adapted for a mobile device. The method comprises: (a). setting a preset route from a starting point to a destination, the preset route comprising at least one preset point; (b). receiving a satellite-positioning signal; (c). determining whether a vehicle being driving along the preset route based on the satellite-positioning signal when the mobile device being located in the vehicle; and (d). performing an alarm action when the vehicle deviating from the preset route for a default alarming time.

The invention further provides a non-transitory computer-readable storage medium storing a computer program for performing a method for monitoring a vehicle path. The method is adapted for a mobile device. The method comprises: setting a preset route from a starting point to a destination, the preset route comprising at least one preset point; receiving a satellite-positioning signal; determining whether a vehicle being driving along the preset route based on the satellite-positioning signal when the mobile device being located in the vehicle; performing an alarm action when the vehicle deviating from the preset route for a default alarming time.

In summary, the technical solutions of the present invention have obvious advantages and beneficial effects over the prior art. With the above technical solutions, considerable advances of technology and extensive utilization in industry can be achieved. The present invention has an advantage in that the passenger is the monitor. By utilizing the mobile device carried by the passenger, the passenger is informed when the vehicle drives along an abnormal path to allow the passenger to become vigilant.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
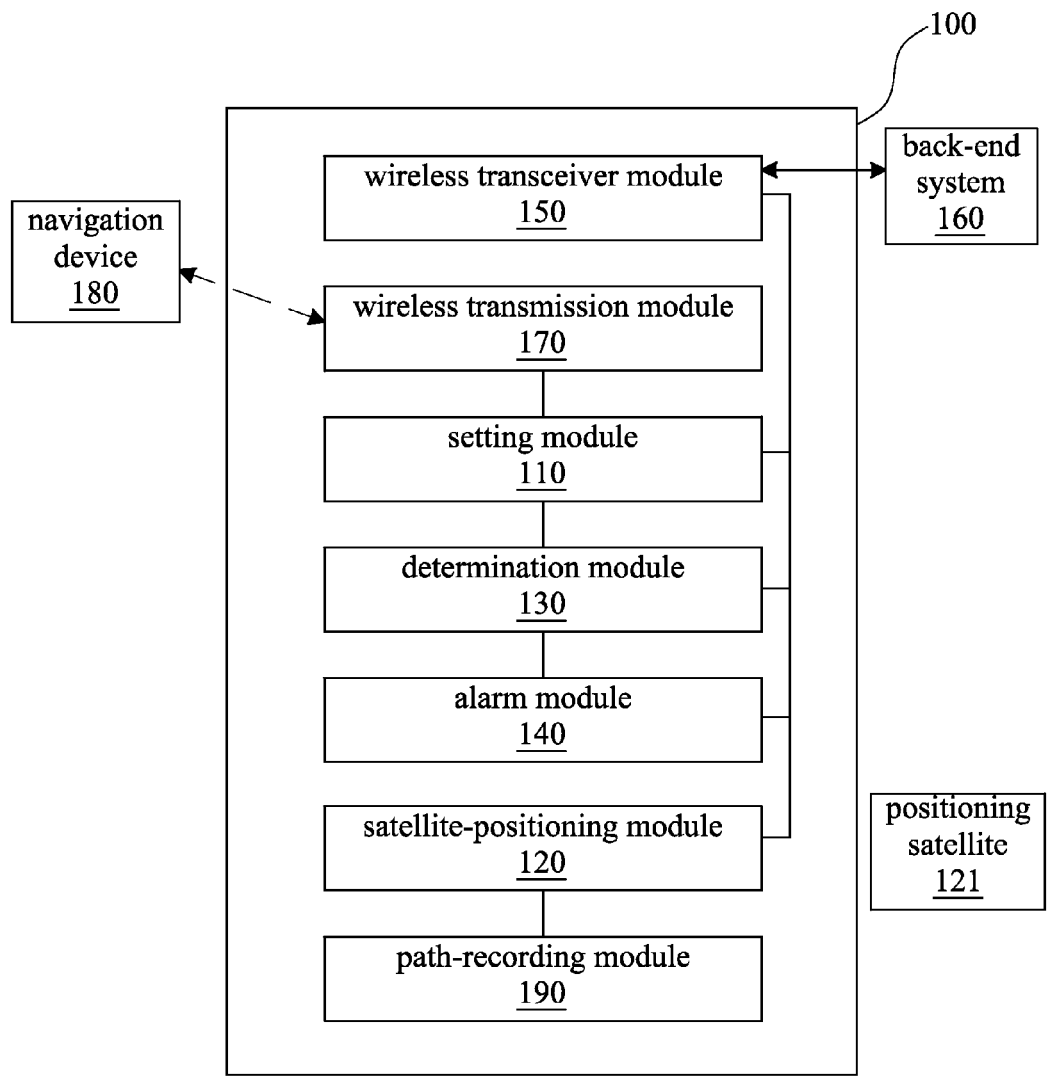
FIG. 1 is a block diagram of a mobile device for monitoring a vehicle path according to an embodiment of the present invention.

Reference will now be made in detail to the present embodiments of the invention, examples of which are illustrated in the accompanying drawings. Wherever possible, the same reference numbers are used in the drawings and the description to refer to the same or like parts. In addition, the well-known components and steps are not described in the embodiments to avoid unnecessary limitations to the present invention.

FIG. 1 is a block diagram of a mobile device 100 for monitoring a vehicle path according to an embodiment of the present invention. The mobile device 100 may be a device with communication function, for example: an intelligent cell phone, a flat panel computer, a notebook computer embedded with a wireless network card. As shown in FIG. 1, the mobile device 100 comprises a setting module 110, a satellite-positioning module 120, a determination module 130, and an alarm module 140.

The setting module 110 is configured to allow users to set a preset route from a starting point to a destination. The preset route comprises at least one preset point. The preset route may be input manually or downloaded by wired/wireless transmission technologies, or even may be set by manual input in combination with download, and saved in the setting module 110. The identities of the users are of vast variety. For the users familiar with the destination or the preset route, the preset route may be input manually. If the users are not familiar with the destination or the preset route or the users have no capacity of setting the preset route, for example: the disabled (such as hearing-impaired person, visual-impaired person, language-impaired person), children, the elderly, or foreigners, etc., the preset route may be downloaded by wired/wireless transmission technologies from a data base (such as web map) or through a setting interface (such as people who are familiar with the destination or the preset route but not the passengers setting the destination or the preset route in advance). In practice, a device with the mobile device 100 may be connected to a computer through a physical transmission line, and the computer is connected to the data base or the setting interface so that the preset route is synchronized to the mobile device 100 within the device. Or, the device may be connected to the data base or the setting interface through a wireless network to download the preset route.

The mobile device 100 may activate the satellite-positioning module 120. The satellite-positioning module 120 may be, for example, a GPS receiver. The satellite-positioning module 120 is configured to receive a satellite-positioning signal from a positioning satellite 121. Once the vehicle moves, its positioning coordinate will change. When the mobile device 100 is located in the vehicle, the determination module 130 is configured to determine whether the vehicle is driving along the preset route based on the satellite-positioning signal. For example, the determination module 130 may compare the positioning coordinate with the destination and calculate via an algorithm to determine whether the positioning coordinate is close to the destination. The algorithm may be implemented in software, hardware, or their combination. When the vehicle deviates from the preset route for a default alarming time (such as 5 minutes), the alarm module 140 is configured to perform an alarm action, for example: images displayed on the screen, sound from the speaker, vibrations generated by the eccentric motor, a pop-up window, or their combinations. As a result, the user will notice that the path monitored by the mobile device 100 for monitoring the vehicle path is abnormal, and be alert of the driver's behavior, namely, possibly malicious detour or even not driving to the destination. The default alarming time may be preset by the system of set by the user.

In another embodiment, when the vehicle deviates from the preset route for a default alarming distance (such as 1 kilometer), the alarm module 140 performs the alarm action. Or, in yet another embodiment, when the vehicle deviates from the preset route for both the default alarming distance and the default alarming time, the alarm module 140 performs the alarm action. Those skilled in the art may make selections flexibly based on requirements then.

In another aspect, the setting module 110 is configured to set communication information (such as telephone number, email box, account number of communication software, etc.) of a back-end system 160. The mobile device 100 further comprises a wireless transceiver module 150, for example: a long-distance communication module, a 3G communication module, a 4G communication module, etc. When the vehicle deviates from the preset route for a default reporting time (such as 10 minutes), the wireless transceiver module 150 is configured to notify the back-end system 160 based on the communication information. In practice, to ensure the user's rights and safety during transportation, the user may manually transmit a notification signal (such as sending the positioning coordinate and the vehicle number by Instant messenger message or short message service, dialoguing directly by dialing the cell phone) via the wireless transceiver module 150 to the back-end system 160, or the wireless transceiver module 150 may automatically transmit the notification signal to the back-end system 160. The back-end system 160 may be a default monitoring agent (such as a connected police department, a dispatch center of the vehicle) preset in the mobile device 100 for monitoring the vehicle path or receivers of the notification signal (such as the user's friends, family kith and kin, or guardian) set by the user. Hence, the back-end system 160 is aware of the user's situation via the notification signal whilst the vehicle path is abnormal so as to contact the user immediately and provide the user with necessary assistance depending on the situation. The user may set a time range in the mobile device 100 previously, and the time range is the default reporting time on which the wireless transceiver module 150 bases to determine when to transmit the notification signal automatically if the vehicle path is determined as abnormal. Or, the user may actively transmit the notification signal to the back-end system 160 via the wireless transceiver module 150 after the alarm module 140 performing at least one alarm action. The default reporting time may be greater than or equal to the default alarming time.

As shown in FIG. 1, the mobile device 100 further comprises a wireless transmission module 170, for example: a short-distance communication module such as a blue tooth module, an infrared module, a wi-fi module, etc. If the vehicle is equipped with a navigation device 180, the user may transmit and synchronize the preset route, set by the user in the setting module 110, to the navigation device 180 of the vehicle via the wireless transmission module 170 of the mobile device 100 by way of wireless transmission technology. The navigation device 180 is thus able to display the preset route. The navigation device 180 of the vehicle may be a navigation system or an electronic device installed with navigation software.

In one embodiment, when the alarm module 140 performs the alarm action, the wireless transmission module 170 transmits an alarming signal to the navigation device 180 synchronously. The navigation device 180 thus issues an alert to warn the driver.

As shown in FIG. 1, the mobile device 100 further comprises a path-recording module 190 configured to record the path travelled by the vehicle. The user may manually record the path travelled by the vehicle in the path-recording module 190 at any time. Or, the user may set to activate the path-recording module 190 when the initial setting of the destination and necessary relay points is performed to automatically record the path travelled by the vehicle. A record of the path travelled by the vehicle may serve as a reference for setting the relay points when the user takes a vehicle from the same starting point to the same destination afterwards. Or, when the path travelled by the vehicle is abnormal, the user or the back end may restore the abnormal situation to clarify the attribution of responsibility afterwards. The record of the path travelled by the vehicle may be further transmitted to the back-end system 160 via the wireless transceiver module 150.

Figure 2:
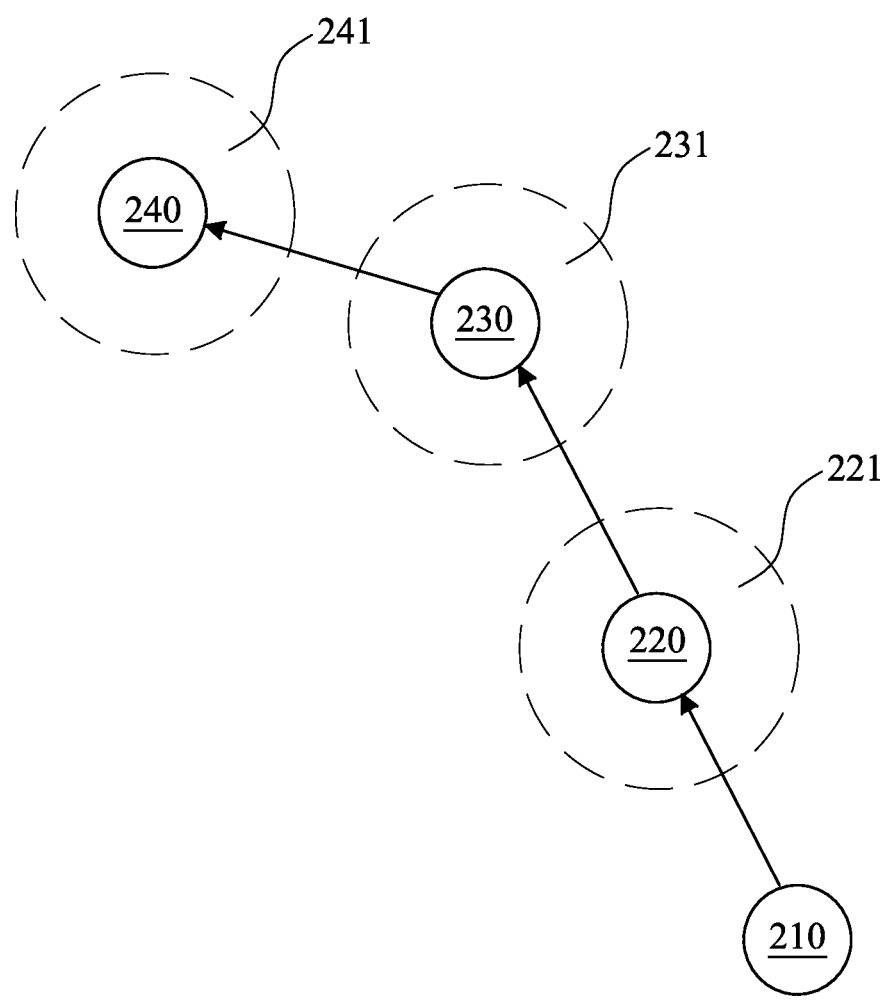
FIG. 2 is a schematic diagram showing a preset route according to an embodiment of the present invention.

In order to elaborate the above-mentioned preset route more specifically, please refer to both FIG. 1 and FIG. 2. In FIG. 2, the preset route comprises the starting point, the destination, and the at least one preset point. The preset point may be a random point along the preset route and serves as the relay point, or the preset point may be the destination. In the present embodiment, the preset route comprises a plurality of preset points 220, 230, 240 in which the preset points 220, 230 are the relay points and the preset point 240 is the destination of the preset route. The sequentially arranged relay points and destination make up the route travelled by the vehicle that is expected by the user. The user may set the relay points based on the route that the user is familiar with, and ask the vehicle driver to drive along the route set by the user. As a result, doubts and worries caused by the user's unfamiliarity with the driving route selected by the vehicle driver when the vehicle driver drives along the route that he is familiar with are avoided.

The vehicle travels from the starting point 210. If the vehicle does not shorten its distance from one of the preset points 220 along the preset route within the default alarming time, the alarm module 140 performs the alarm action to alert the user.

Furthermore, the wireless transceiver module 150 will notify the back-end system 160 based on the communication information if the vehicle does not shorten its distance from the preset point 220 within the default reporting time. The default reporting time is greater than or equal to the default alarming time.

If the vehicle shortens its distance from the preset points 220, the determination module 130 determines whether a distance between the vehicle and the preset point 220 is within a distance range of allowable error 221. If the distance between the vehicle and the preset point 220 is within the distance range of allowable error 221, the determination module 130 determines whether the preset point 220 is the destination of the preset route. If the preset point 220 is not the destination, the determination module 130 determines whether the vehicle shortens its distance from the next preset point 230 along the preset route. The above-mentioned determination mechanism is repeated until the vehicle reaches the preset point 240 that is the destination, and the determination module 130 determines that the vehicle has reached the destination.

In practice, the distance ranges of allowable error 221, 231, 241 may be set with distance, time, or their combination, for example: 500 meters, one minute drive, or synthetic judgment. The distance ranges of allowable error 221, 231, 241 may be the same. Or, the distance ranges of allowable error 221, 231, 241 may be set differently based on the environmental restrictions of the preset points 220, 230, 240. For example: the preset points 220, 230, 240 are taken as the center points and their surrounding areas extending outward are set as the distance ranges of allowable error 221, 231, 241 of the preset points 220, 230, 240. The distance ranges of allowable error 221, 231, 241 may be the default settings in the mobile device 100, or may be defined by the user.

The setting module 110, the determination module 130, etc., as mentioned previously, may be specifically implemented in software or hardware and/or firmware. For example, if the operating speed and precision are both the first considerations, these modules may be mainly implemented in hardware and/or firmware. If design flexibility is the first consideration, these modules are mainly implemented in software. Or, these modules operate with the collaboration of software, hardware, and firmware. It should be understood that none of the above examples is more preferable than any of the other examples, nor are they intended to limit the scope of the invention. Those skilled in the art may specifically implement these modules with flexibility according to the requirements then.

Figure 3:
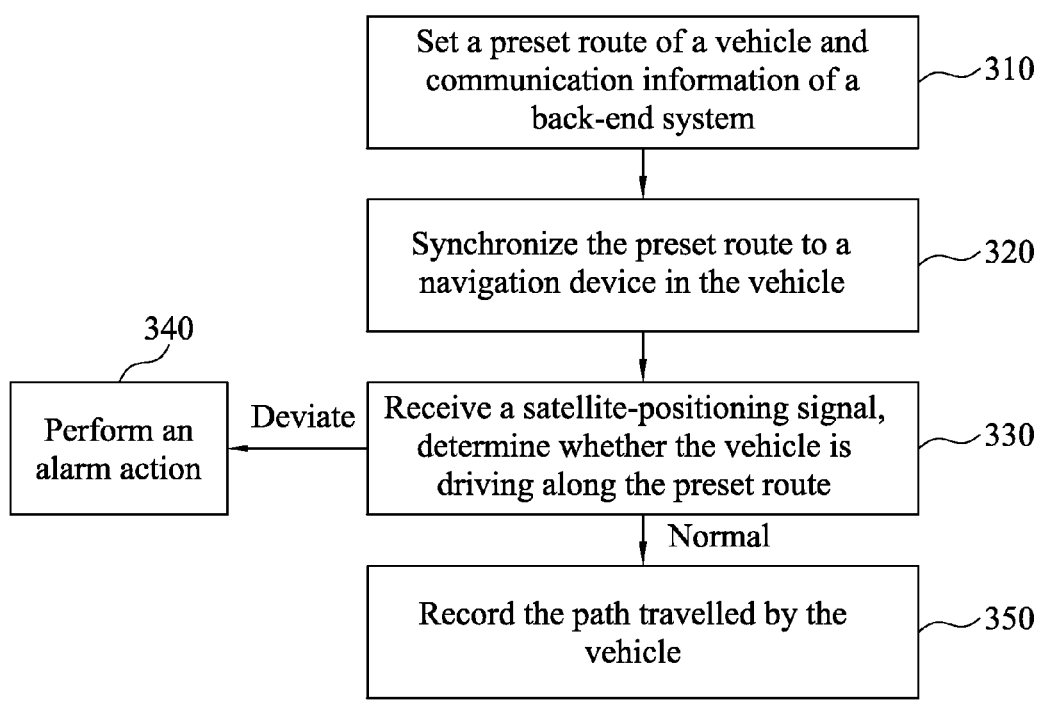
FIG. 3 is a flow chart of a method for monitoring a vehicle path according to an embodiment of the present invention.

FIG. 3 is a flow chart of a method 300 for monitoring a vehicle path according to an embodiment of the present invention. As shown in FIG. 3, the method 300 comprises steps 310-350 (it should be understood that the order of the steps mentioned in the present embodiment may be changed based on actual requirement unless otherwise specified, or the steps may even be performed simultaneously or part of the steps may even be performed simultaneously). Since the hardware devices for implementing these steps have been specifically disclosed in the above embodiments, further elaboration is not provided.

In practice, the method 300 may be implemented with a mobile device, for example: the above-mentioned mobile device 100, etc. Or, part of the functions is implemented in a computer program that is stored in a non-transitory computer-readable storage medium (e.g., a floppy disk, a hard disk drive, a Compact Disc (CD), a Digital Video Disk (DVD), a digital tape, a computer memory, etc) to allow a computer to command a mobile device performing the method 300 after reading the storage medium.

In step 310, set a preset route from a starting point to a destination. The preset route comprises at least one preset point. In step 320, transmit and synchronize the preset route to a navigation device in the vehicle to allow the navigation device to display the preset route. In step 330, receive a satellite-positioning signal and determine whether the vehicle is driving along the preset route based on the satellite-positioning signal when the mobile device is located in the vehicle. In step 340, perform an alarm action to alert the user when the vehicle deviates from the preset route for a default alarming time.

Furthermore, when the alarm action is performed, in step 340, transmit an alarming signal to the navigation device synchronously so that the navigation device issues an alert to warn the driver.

In step 310, set communication information of a back-end system. In step 340, notify the back-end system based on the communication information when the vehicle deviates from the preset route for a default reporting time. The default reporting time is greater than or equal to the default alarming time.

If the vehicle reaches the destination along the preset route normally, in step 350, record the path travelled by the vehicle. A record of the path travelled by the vehicle may serve as a reference for setting relay points when the user takes a vehicle from the same starting point to the same destination afterwards, or the abnormal situation may be restored to clarify the attribution of responsibility afterwards.

Figure 4:
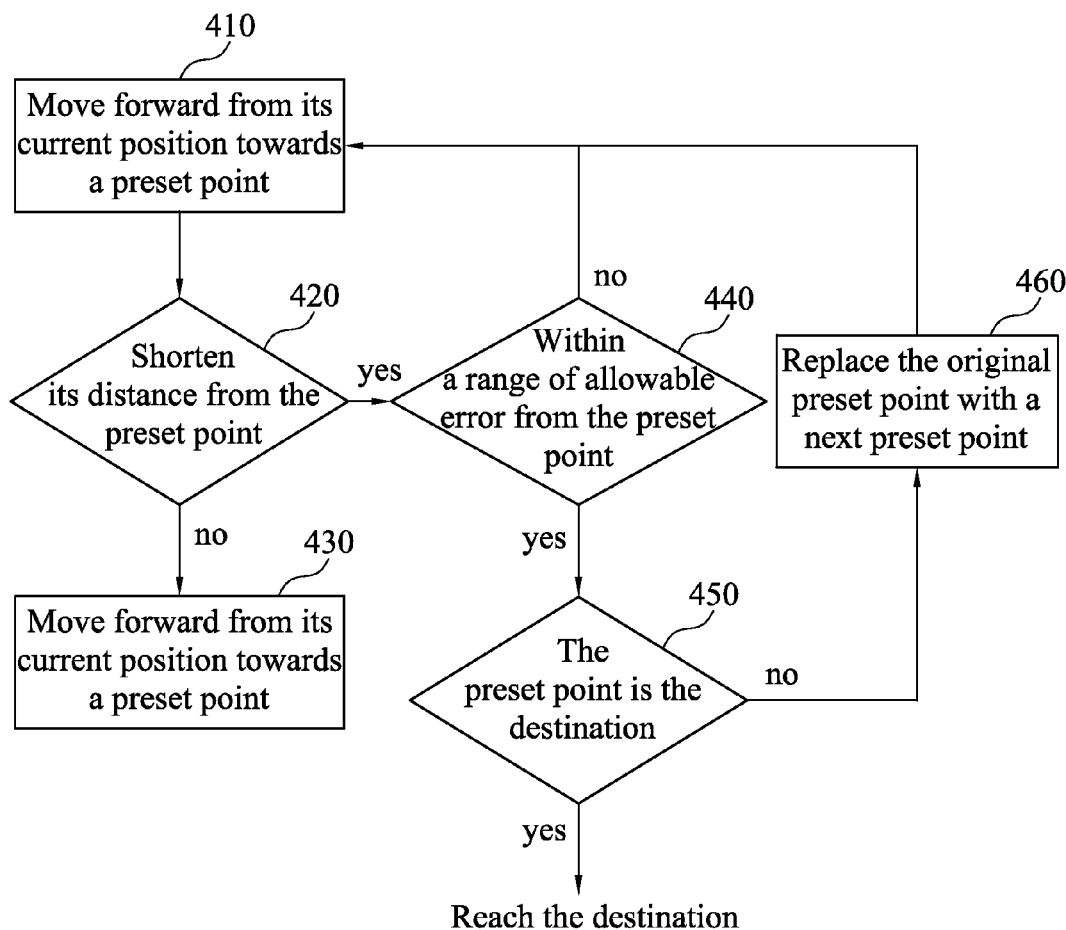
FIG. 4 is a flow chart of a method for monitoring a vehicle path according to another embodiment of the present invention.

In order to elaborate the above-mentioned preset route more specifically, please refer to FIG. 4. FIG. 4 is a flow chart of a method 400 for monitoring a vehicle path according to another embodiment of the present invention. As shown in FIG. 4, the method 400 comprises steps 410-460 (it should be understood that the order of the steps mentioned in the present embodiment may be changed based on actual requirement unless otherwise specified, or the steps may even be performed simultaneously or part of the steps may even be performed simultaneously). Since the hardware devices for implementing these steps have been specifically disclosed in the above embodiments, further elaboration is not provided.

In the present embodiment, the preset route is made up of a plurality of preset points, for example: one or more relay points. Specifically, in step 410, a vehicle moves forward from its current position. In step 420, determine whether the vehicle is approaching towards one of the preset points along the preset route. If the vehicle does not shorten its distance from the preset point within a default alarming time, in step 430, an alarm module performs an alarm action, and/or in step 430, if the vehicle does not shorten its distance from the preset point within a default reporting time, notify a back-end system based on the above-mentioned communication information. The default reporting time is greater than or equal to the default alarming time.

If the vehicle is approaching towards the preset point, in step 440, determine whether a distance between the vehicle and the preset point is within a distance range of allowable error. If the distance between the vehicle and the preset point is within the distance range of allowable error, in step 450, determine whether the preset point is the destination of the preset route. If the preset point is not the destination, in step 460, replace the original preset point with a next preset point in the preset points and go back to step 410. Re-determine whether the vehicle shortens its distance from the next preset point along the preset route, and in step 420 determine whether the vehicle is approaching towards the next preset point along the preset route. The above-mentioned processes are repeated until in step 450 the preset point is the destination and determine that the vehicle has reached the destination.

In summary, the objective of the present invention is to ensure passengers' rights and safety. The present invention focuses on front-end monitoring. By utilizing the mobile device carried by the passenger, the passenger is informed when the vehicle drives along an abnormal path to allow the passenger to become vigilant.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A mobile device for monitoring a vehicle path, comprising:
   a setting module being configured to set a preset route from a starting point to a destination, the preset route comprising at least one preset point;
   a satellite-positioning module being configured to receive a satellite-positioning signal;
   a determination module being configured to determine whether a vehicle is being driven along the preset route based on the satellite-positioning signal when the mobile device is located in the vehicle; and
   an alarm module being configured to performing an alarm action when the vehicle deviates from the preset route for a default alarming time,
   wherein the determination module determines the preset point is the destination, when a distance between the vehicle and the preset point is shortened and is within an allowable distance error range.

2. The mobile device of claim 1, further comprising:
   a wireless transmission module being configured to transmit and synchronize the preset route in the setting module to a navigation device in the vehicle to allow the navigation device to display the preset route.

3. The mobile device of claim 2, wherein when the alarm module performs the alarm action, the wireless transmission module transmits an alarming signal to the navigation device synchronously so that the navigation device issues an alert.

4. The mobile device of claim 2, wherein the setting module is configured to set communication information of a back-end system, and the mobile device further comprises:
   a wireless transceiver module being configured to notify the back-end system based on the communication information when the vehicle deviates from the preset route for a default reporting time, the default reporting time being greater than or equal to the default alarming time.

5. The mobile device of claim 4, wherein when the vehicle does not shorten its distance from the preset point within the default reporting time, the wireless transceiver module notifies the back-end system based on the communication information, the default reporting time is greater than or equal to the default alarming time.

6. The mobile device of claim 1, further comprising:
   a path-recording module being configured to record a path travelled by the vehicle.

7. The mobile device of claim 1, wherein if the vehicle does not shorten its distance from the preset point within the default alarming time, the alarm module performs the alarm action.

8. The mobile device of claim 1, wherein the determination module determines whether the vehicle shortens its distance from a next preset point along the preset route if the preset point is not the destination point.

9. A method for monitoring a vehicle path adapted for a mobile device, comprising:
  (a) setting a preset route from a starting point to a destination, the preset route comprising at least one preset point;
  (b) receiving a satellite-positioning signal using a satellite-positioning module;
  (c) determining whether a vehicle is being driven along the preset route based on the satellite-positioning signal when the mobile device is located in the vehicle; and
  (d) performing an alarm action when the vehicle deviates from the preset route for a default alarming time,
  wherein a determination module determines the preset point is the destination, when a distance between the vehicle and the preset point is shortened and is within an allowable distance error range.

10. The method of claim 9, further comprising:
  transmitting and synchronizing the preset route to a navigation device in the vehicle to allow the navigation device to display the preset route.

11. The method of claim 10, further comprising:
  transmitting an alarming signal to the navigation device synchronously when the alarm action being performed so that the navigation device issues an alert.

12. The method of claim 10, further comprising:
  setting communication information of a back-end system, and
  notifying the back-end system based on the communication information when the vehicle deviates from the preset route for a default reporting time, the default reporting time being greater than or equal to the default alarming time.

13. The method of claim 12, further comprising:
  notifying the back-end system based on the communication information when the vehicle is not shortening its distance from the preset point within the default reporting time, the default reporting time being greater than or equal to the default alarming time.

14. The method of claim 9, further comprising:
  recording a path travelled by the vehicle.

15. The method of claim 9, wherein step (d) comprises:
  performing the alarm action if the vehicle is not shortening its distance from the preset point within the default alarming time.

16. The method of claim 9, wherein step (c) further comprises:
  determining whether the vehicle shortens its distance from a next preset point along the preset route if the preset point not being the destination point.

17. A non-transitory computer-readable storage medium storing a computer program for performing a method for monitoring a vehicle path, the method being adapted for a mobile device, the method comprising:
  setting a preset route from a starting point to a destination, the preset route comprising at least one preset point;
  receiving a satellite-positioning signal using a satellite-positioning module;
  determining whether a vehicle is being driven along the preset route based on the satellite-positioning signal when the mobile device is located in the vehicle;
  performing an alarm action when the vehicle deviates from the preset route for a default alarming time, and
  determining that the preset point is the destination when a distance between the vehicle and the preset point is shortened and is within an allowable distance error range.

\* \* \* \* \*